(12) United States Patent
Kuras et al.

(10) Patent No.: US 7,920,949 B2
(45) Date of Patent: Apr. 5, 2011

(54) FEEDBACK ADJUSTMENT FOR OPEN-LOOP TORQUE CONTROL MAP

(75) Inventors: Brian D Kuras, Metamora, IL (US); Frank A DeMarco, East Peoria, IL (US); Adam J Vaccari, Peoria, IL (US); Tyler Bowan, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 955 days.

(21) Appl. No.: 11/752,136

(22) Filed: May 22, 2007

(65) Prior Publication Data

US 2008/0294318 A1 Nov. 27, 2008

(51) Int. Cl.
*F16H 9/00* (2006.01)

(52) U.S. Cl. ............ 701/55; 701/51; 477/37; 477/44; 477/45; 477/46

(58) Field of Classification Search .......... 701/51, 701/55, 56; 477/37, 43, 44, 45, 46
See application file for complete search history.

(56) References Cited

U.S. PATENT DOCUMENTS

| | | | |
|---|---|---|---|
| 4,709,775 A | 12/1987 | Watanabe et al. | |
| 5,249,422 A | 10/1993 | Smith et al. | |
| 5,295,415 A | 3/1994 | Abe et al. | |
| 5,433,676 A | 7/1995 | Abe et al. | |
| 5,521,819 A * | 5/1996 | Greenwood | 701/60 |
| 5,628,187 A | 5/1997 | Gollner | |
| 5,628,188 A | 5/1997 | Kordak | |
| 6,038,504 A | 3/2000 | Cronin et al. | |
| 6,146,308 A | 11/2000 | Taniguchi et al. | |
| 6,181,020 B1 | 1/2001 | Uchida et al. | |
| 6,223,111 B1 | 4/2001 | Cronin et al. | |
| 6,260,440 B1 | 7/2001 | Cronin et al. | |
| 6,295,497 B1 | 9/2001 | Kuras | |
| 6,385,970 B1 | 5/2002 | Kuras et al. | |
| 6,397,152 B1 * | 5/2002 | Kalweit et al. | 702/41 |
| 6,402,660 B1 | 6/2002 | Cronin et al. | |
| 6,424,902 B1 | 7/2002 | Kuras | |
| 6,497,636 B2 * | 12/2002 | Schleicher et al. | 477/37 |
| 2007/0101709 A1 | 5/2007 | Cronin | |

FOREIGN PATENT DOCUMENTS

EP 0 522 171 1/1993

\* cited by examiner

*Primary Examiner* — Thomas G Black
*Assistant Examiner* — Peter D Nolan
(74) *Attorney, Agent, or Firm* — Leydig, Voit & Mayer

(57) ABSTRACT

A variator torque control system and method utilize a hydraulic actuator to control the variator output via a torque control map, wherein the values of the torque control map are evaluated and modified during use of the map to improve map accuracy. In an example, errors in the map are evaluated to determine whether a system fault has occurred.

20 Claims, 6 Drawing Sheets

FEEDBACK ADJUSTMENT FOR OPEN-LOOP TORQUE CONTROL MAP

TECHNICAL FIELD

This patent disclosure relates generally to hydrostatic torque controlling transmissions, and, more particularly to a system for progressively modifying a variator torque control map.

BACKGROUND

Many transmission systems such as continuously variable transmissions (CVTs) employ a torque controlling element to provide a continuously variable torque or speed transmission capability. An example of such a transmission is a split torque transmission, wherein a drive train is powered by dual inputs, one of which may be a torque-controlled input, such as from a hydraulic variator. In such systems, it is desirable to accurately control the variator such that the resultant actual operation of the system based on control signals corresponds to the expected operation of the system. For example, a discrepancy between the expected and actual operation of the system may result in deteriorated shifting performance resulting in operator discomfort, system inefficiency, and/or increased drive train wear.

In attempting to reduce this problem, a number of systems utilize a calibration or torque control map that links an input pressure or pressure differential to an output torque of the variator. Nonetheless, under actual operating conditions, some entries in the torque control map may be erroneous or may become erroneous due to the gradual wear of components, play or slop in the control system, and so on, thus still leaving an often significant discrepancy between the expected and actual operation of the system.

The foregoing background discussion is intended solely to aid the reader. It is not intended to limit the innovation, and thus should not be taken to indicate that any particular element of a prior system is unsuitable for use within the described and/or claimed system, nor is it intended to indicate any element, including solving the motivating problem, to be essential in implementing the innovations described herein. The implementations and application of the innovations described herein are defined by the appended claims.

BRIEF SUMMARY OF THE DISCLOSURE

In one aspect, a method is provided for controlling an output torque of a variator that is operated via a hydraulic actuator. A controller first receives an indication of an expected torque, evaluates a number of parameters related to operation of the variator, and reads a map to link the evaluated parameters to a value for the actuator pressure signal. After applying the mapped value to the hydraulic actuator as an actuator pressure signal, the controller measures the output torque of the variator and compares the output torque to the expected output torque to derive an error value. If the error value conforms to at least one modification condition, the mapped value is replaced with a modified value.

Additional and alternative features and aspects of the disclosed system and method will be appreciated from the following description.

DETAILED DESCRIPTION

This disclosure relates to a system and method for controlling a variator via a torque control map, wherein the torque control map is progressively refined during use. Using the described system, inaccurate torque control values in the map may be modified to improve accuracy, and in an example the magnitude and/or frequency of needed map corrections are used to determine whether a variator system fault has occurred or is occurring. Moreover, the map modification system may be used to create a torque control map in the first instance, saving labor costs and avoiding human error.

Figure 1:
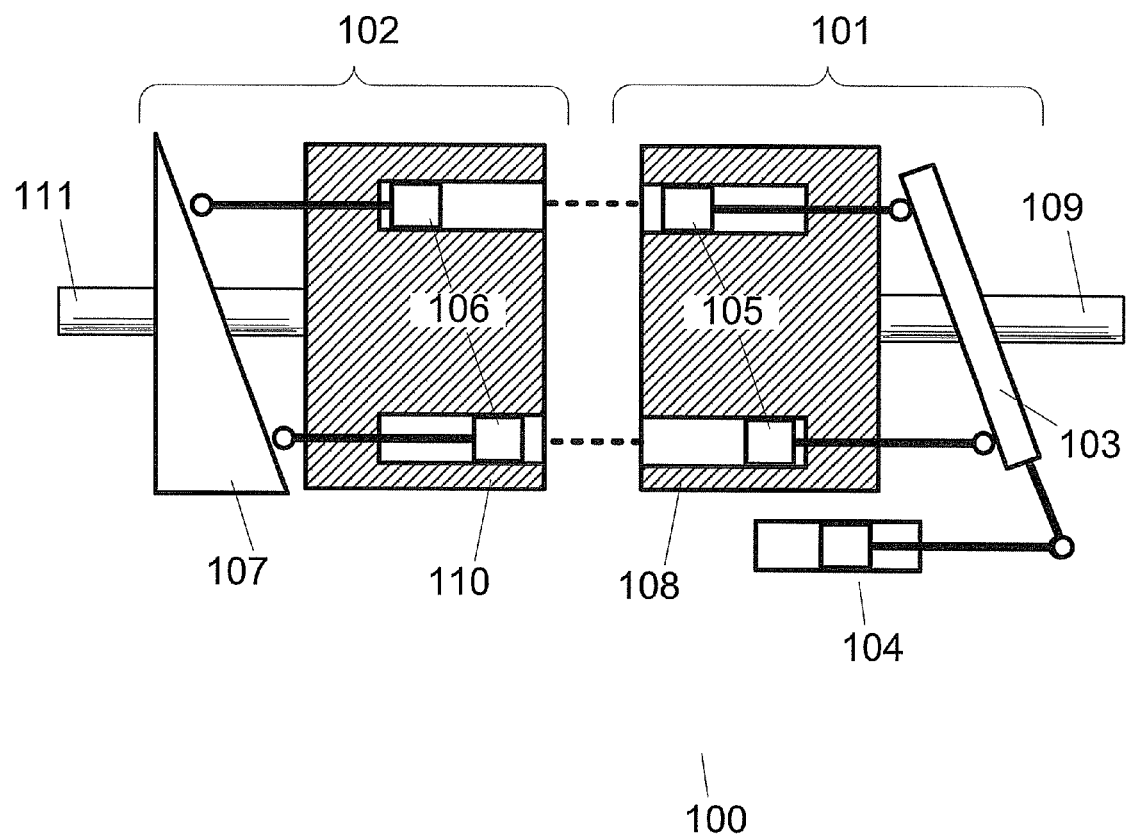
FIG. 1 is a detailed schematic drawing of a variator for providing a variable output torque based on an applied control pressure differential.

FIG. 1 is a detailed schematic drawing of a variator 100 for providing a variable output torque based on an applied control pressure differential in the swash plate actuator 104. The variator 100 comprises a pump 101 and a motor 102. The pump 101 comprises a variable angle swash plate 103 set by a swash plate actuator 104. A number of pistons 105 in respective chambers ride on the swash plate 103 via sliding contacts, such that the range of movement of the pistons 105 is set by the angle of the swash plate 103. The chambers for the pistons 105 are formed in a pump carrier 108 that is rotated via the pump input shaft 109.

The motor 102 comprises a similar arrangement including a number of pistons 106 in respective chambers. The pistons 106 of the motor 102 are slidably engaged upon a fixed swash plate 107. It will be appreciated that the angle of swash plate 107 may also be variable, so as to allow a variable displacement. The chambers of the pistons 105 of the pump 101 are in fluid communication with the chambers of the pistons 106 of the motor 102 via hydraulic fluid that fills the chambers and intervening conduits (not shown). The chambers for the pistons 106 are formed in a motor carrier 110 that rotates the motor output shaft 111. As the angle of the swash plate 103 is varied, the amount of fluid displaced by the pistons 105 of the pump 101 (and thus the fluid volume received or taken from the chambers of the pistons 106) varies.

Because of these interrelationships, the torque varies with the net force applied to the swash plate 103 and the output speed of the motor 102 varies with the angle of swash plate 103. In overview, the swash plate actuator 104, which in this example operates on differential hydraulic pressure, is driven via solenoid valves (not shown), e.g., one for each of two pressure values, controlled electronically by appropriate input signals from a transmission controller or the like. In this way, the controller can control the torque of the variator 100 via the application of electrical signals to solenoid valves associated with the swash plate actuator 104.

Figure 2:
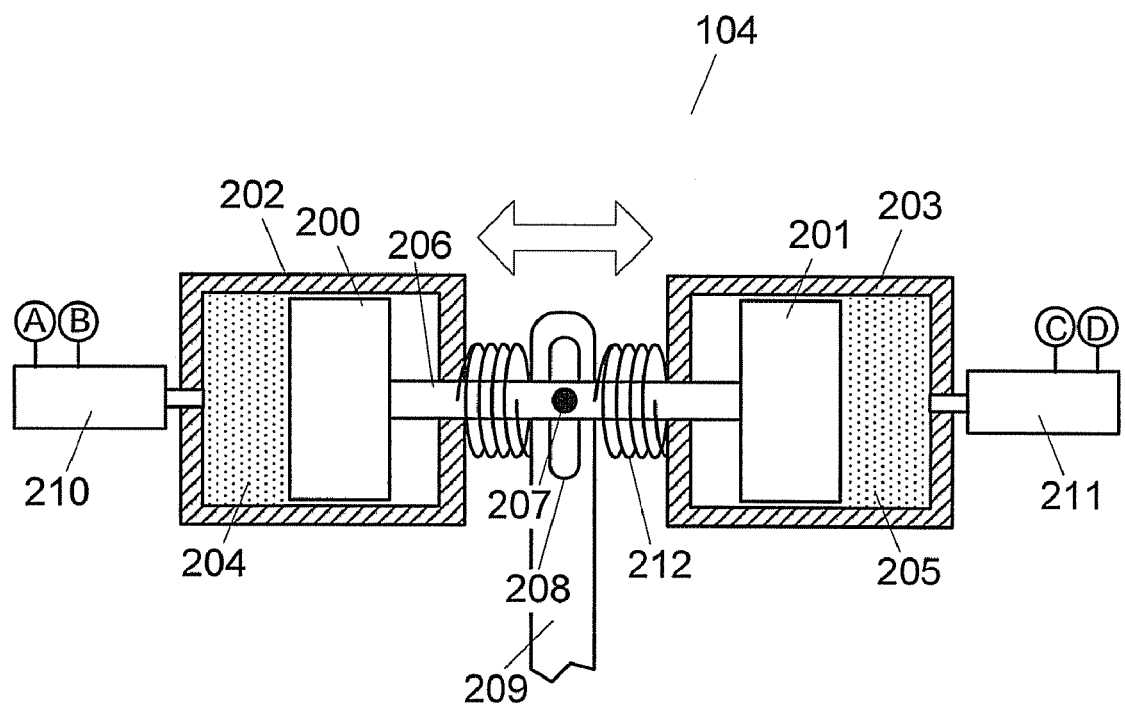
FIG. 2 is a detailed schematic drawing of a hydraulic actuator for controlling the position of a variable-angle swash plate in a variator such as that shown in FIG. 1.

FIG. 2 is a detailed schematic drawing of a hydraulic actuator 104 for controlling the actuation force on the variable-angle swash plate (not shown) in a variator 100 such as that shown in FIG. 1. The actuator 104 includes a number of interrelated elements including primarily two opposed pistons 200, 201, within respective cylinders 202, 203. The pistons 200, 201 cooperate with the bores of their respective cylinders 202, 203 to form respective pressure chambers 204, 205 for containing pressurized hydraulic fluid.

The pistons 200, 201 are joined by a bar 206 which has a central pivot pin 207 mounted thereon. The central pivot pin 207 interferes within a slot 208 in a swash plate arm 209, such that the lateral position of the bar 206 establishes the position of the swash plate arm 209 and hence the angle of the swash plate itself (not shown). The bar 206 is biased to a central position by opposing springs 212. As the bar 206 is displaced from this central position, there is a restoring force exerted by springs 212 that is proportional to the displacement.

The lateral position, velocity, and acceleration of the bar 206 is determined by the sum of the forces acting on the pistons 200, 201. The forces acting on the pistons 200, 201 are derived from the following sources: (1) pressures in chambers 204 and 205, (2) forces from the spring 212, which are a function of displacement of pistons 200, 201, and (3) swivel forces acting through the swash plate which are a function of torque, pump speed, motor speed, etc. Respective pressure valves 210, 211 independently control the pressure within chambers 204, 205. In an example, the pressure valves 210, 211 are solenoid valves that supply hydraulic fluid at a pressure that is set by an applied current within limits set by a supply pressure. Thus, in the illustrated example, each valve 210, 211 has at least a current input (illustrated as inputs A and C) and a fluid input (illustrated as inputs B and D). Typically, solenoid valves can supply fluid at any pressure between zero and the fluid pressure at the fluid input B, D.

Considering FIG. 2 in conjunction with FIG. 1, it will be appreciated that the torque supplied at output 111 is directly related to the pressure differential applied by valves 210, 211. In particular, the fluid pressure within the hydraulic circuit is related to the pressure differential applied by valves 210, 211. Thus, in torque-controlled applications, it is desirable to accurately correlate combinations of solenoid currents for valves 210 and 211 (or applied pressure differential in actuator 104) with expected associated output torques at output 111.

Figure 3:
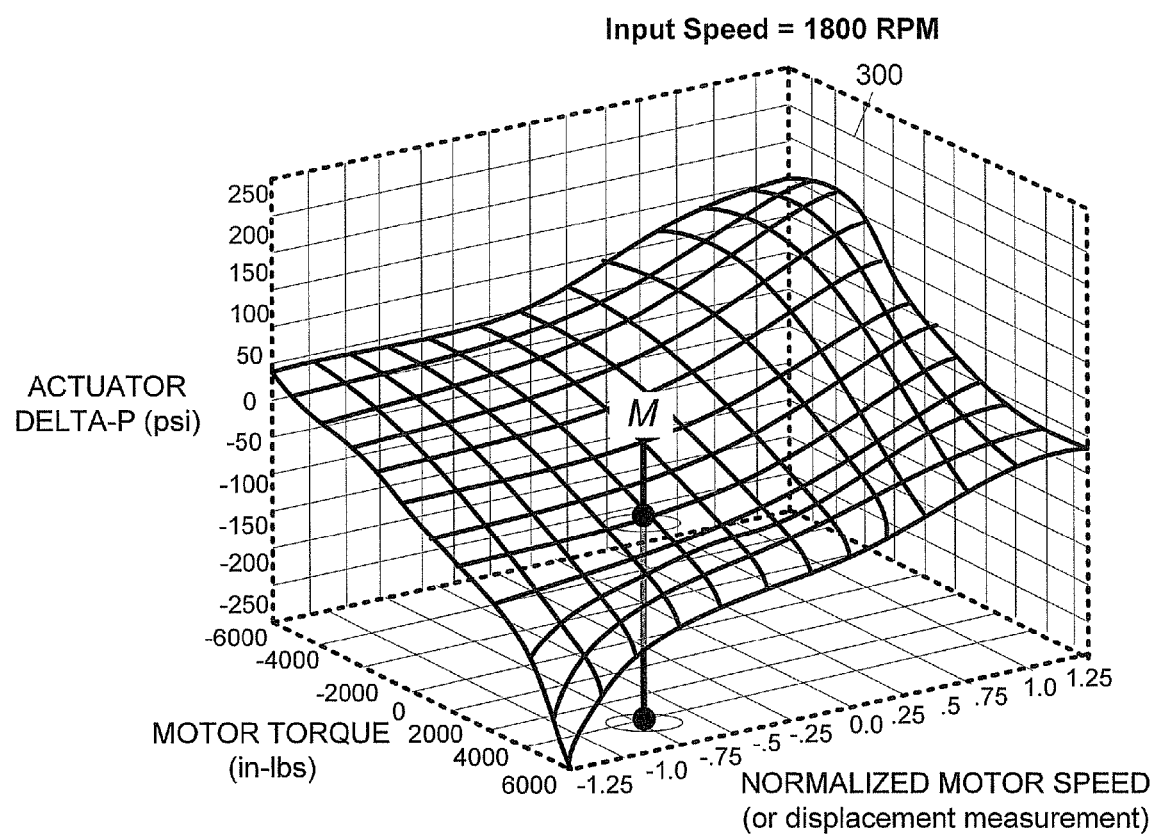
FIG. 3 is a three-dimensional section of a four dimensional map correlating actuator pressure differentials, variator input speeds and variator output speeds with expected output torques at a variator input speed of 1800 RPM.

As a first step, a predetermined map is used to correlate specific pressure differentials with specific expected output torques. In practice, the relationship between these values also depends upon the following: (1) pump displacement of piston 104 (measured directly via a displacement sensor, or calculated by motor speed/pump speed, e.g., via normalized motor speed), and (2) input (pump) speed. Thus, a 4-dimensional mapping is used to correlate the various values. FIG. 3 illustrates such a map with the un-shown dimension of variator input speed set at 1800 RPM. Thus, the illustrated surface 300 correlates expected output torque (left horizontal axis) with a combination of the applied pressure differential in the actuator 104 (vertical axis) and the known variator normalized motor speed or displacement (right horizontal axis, normalized). Different absolute variator input speeds would result in different 3-dimensional surfaces relating the remaining variables.

Because of the many variables, including tolerances, operating conditions, and other factors, that influence the output of the variator 100, the map 300 is not always accurate during use, and thus the output torque may vary from the desired output torque. This can affect a number of facets of operation, including, for example, the ease and smoothness of shifting of a transmission associated with the variator 100.

Accordingly, a feedback process progressively refines and improves the map 300 during operation of the system so that the actual torque output of the variator 100 gradually becomes more closely correlated to the desired torque. In additional and alternative examples, the amount of correction required with respect to the map 300 serves as an indication of system condition. For example, if large corrections to the map 300 become required, this may be used as an indication that some portion of the hydraulic system is potentially faulted or failing.

Typically the map 300 is empirically derived or otherwise created prior to actual operation of the variator 100 and is fixed during such operation. However, in an embodiment, the torque control maps are created via the map adaptation process described herein at the beginning of operation.

Figure 4:
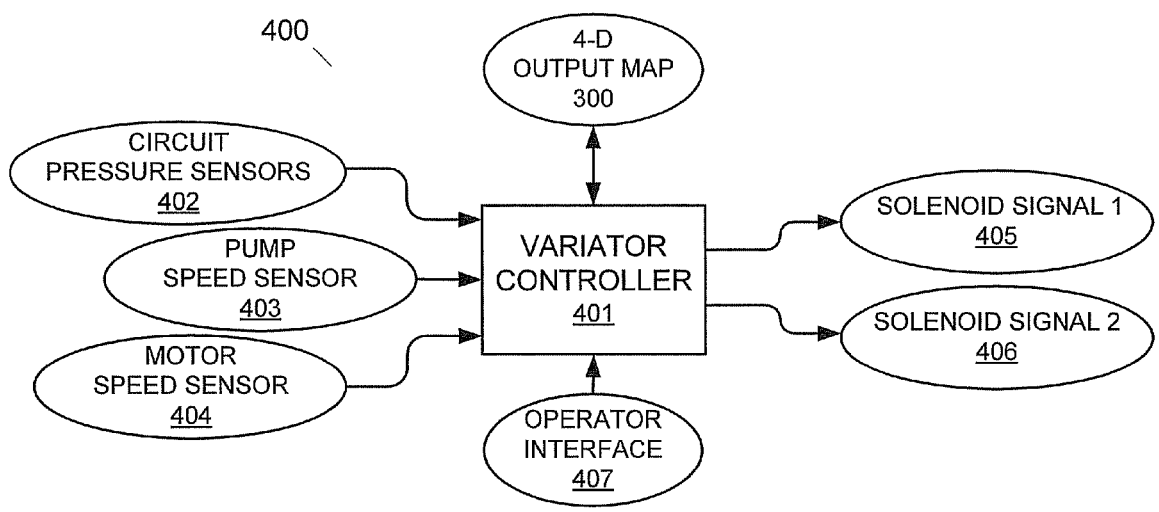
FIG. 4 is a simplified logical schematic of control components and data flow associated with an actuator to effectively control a variator.

Before discussing the map modification process in detail, the control infrastructure and informational flow within the system will be discussed. FIG. 4 is a simplified logical schematic 400 of the control components and data flow associated with the mechanical components of FIG. 2 to effectively control the operation of the variator 100. In overview, a variator controller 401 directs the operation of the variator 100 via solenoid valves 210 and 211. The variator controller 401 may be a dedicated variator controller, but more typically will also control a larger system, such as a transmission, associated with the variator 100.

The controller 401 may be of any suitable construction, however in one example it comprises a digital processor system including a microprocessor circuit having data inputs and control outputs, operating in accordance with computer-readable instructions stored on a computer-readable medium. Typically, the processor will have associated therewith long-term (non-volatile) memory for storing the program instructions, as well as short-term (volatile) memory for storing operands and results during (or resulting from) processing.

In operation, the controller 401 receives a number of data inputs from the variator system 100 and provides a number of control outputs to the system 100. In particular, the controller 401 has a first data input connected to circuit pressure sensors 402. Although it is possible to use a single pressure sensor, it is desirable to use multiple sensors to obtain more accurate pressure readings. The circuit pressure sensors 402 are positioned and adapted to sense the hydraulic pressure within the internal hydraulic circuit of the variator 100 (i.e., between pistons 105 and 106) and to provide signals related to the sensed pressures.

A second data input to the controller 401 is linked to a pump speed sensor 403. The pump speed sensor 403 is positioned and adapted to detect the rotational speed of the variator input shaft 109 and to provide a signal related to the sensed rotational input speed. A motor speed sensor 404 is linked to a third data input of the controller 401. The motor speed sensor 404 is positioned and adapted to detect the rotational speed of the variator output shaft 111 and to provide a signal related to the sensed rotational output speed. It will be appreciated that the pump displacement (e.g., derived from the stroke of actuator 104) or the angle of the swash plate 103 (e.g., derived from an angle sensor) can be used as an input in place of the normalized motor speed.

In order to detect a desired torque, the controller 401 also receives a data input from the operator interface 407, e.g., an accelerator setting. The operator may be human or automated, and the operator interface may vary accordingly. The variator controller 401 also reads the 4-D output map 300 discussed with reference to FIG. 3.

Based on the various available inputs as discussed above, the controller 401 calculates and provides appropriate control signals to the actuator 104 such that the variator output torque more closely corresponds to the desired output torque. In particular, the controller 401 provides two solenoid control signals 405, 406 to control the operation of the actuator 104 and thus the operation of the variator 100. The solenoid control signals 405, 406 include a first solenoid control signal 405 to control a first one 210 of the actuator pressure valves and a second solenoid control signal 406 to control a second one 211 of the actuator pressure valves.

Figure 5:
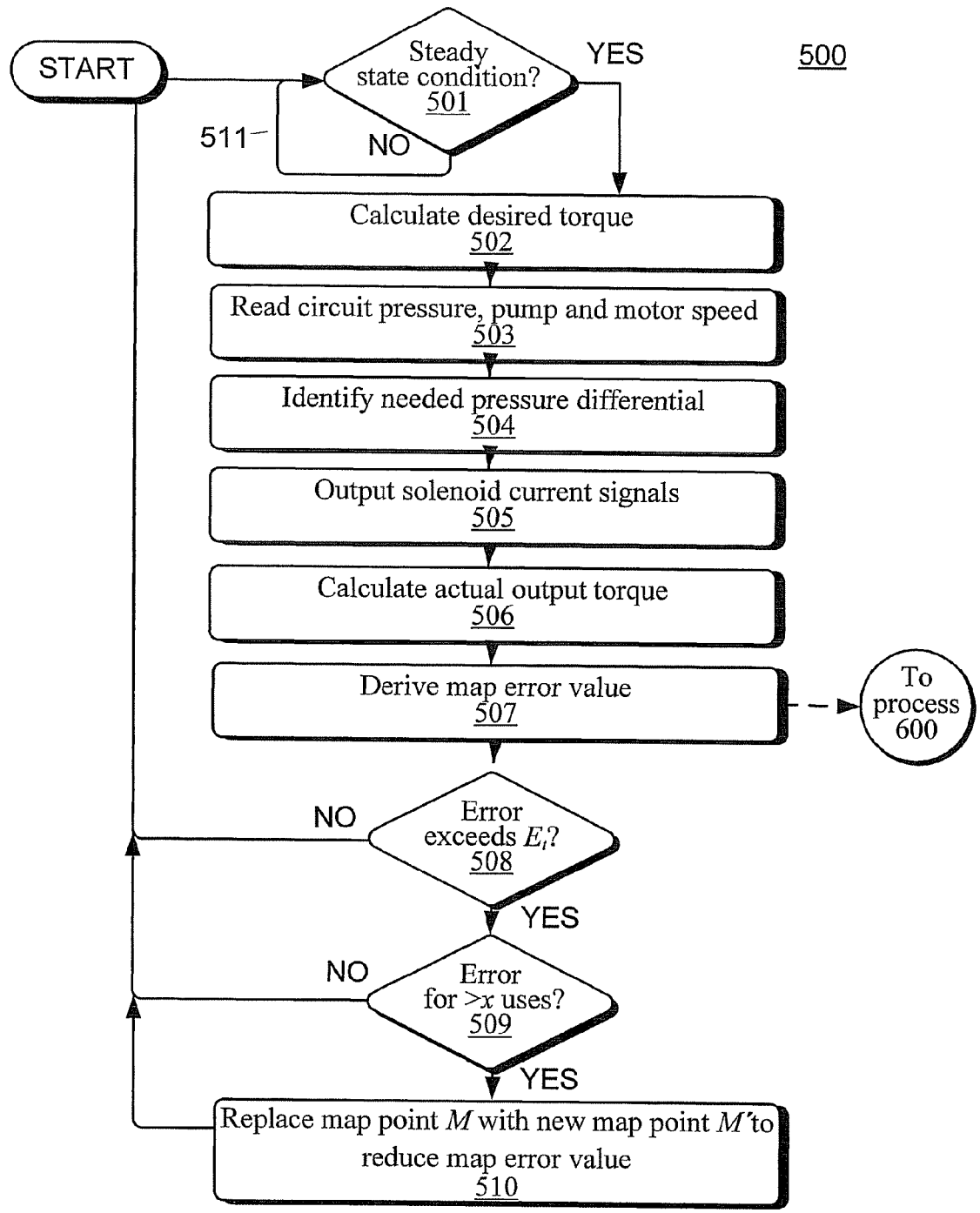
FIG. 5 is a flowchart illustrating a process for modifying a torque control map to improve the correspondence between actual and expected output torques.

In addition to controlling the variator 100, in an embodiment the controller 401 also detects inaccuracies in the map 300 and modifies the map 300 to reduce such inaccuracies. In particular, the flow chart 500 of FIG. 5 illustrates a process for updating the map 300 in order to improve the correspondence between actual and expected torques.

In a first stage 501, the controller 401 awaits a steady state condition in the transmission in order to ensure that any aberrations in the expected operation of the variator 100 are the result of inaccuracies in the map to be corrected and not the result of transient effects. The steady state criteria may include any suitable criteria, but in an example a steady state is detected when one or more selected parameters such as machine acceleration and/or deceleration, variator output acceleration and/or deceleration, and/or transmission output ratio change are below respective threshold values.

Once it is established in stage 501 that steady state operation is occurring, the controller 401 calculates a desired torque in stage 502 from information received at the operator interface 407. The desired torque may be a value that is directly calculated from operator input, e.g., accelerator position, or that is indirectly calculated, e.g., from transmission operation, wherein the state of the transmission is based on current and past operator inputs. At stage 503, the controller 401 reads the variator state including the circuit pressure from circuit pressure sensors 402, the pump speed from pump speed sensor 403, and the motor speed from the motor speed sensor 404. As noted above, the pump displacement and/or the angle of the swash plate 103 may be used in place of the normalized motor speed.

The controller 401 reads the map 300 at stage 504 and identifies a needed actuator pressure differential to yield the desired torque based on the map 300. It will be appreciated that there are typically a plurality of different torque control maps available for use, and that the appropriate map for use at any particular time will be selected as needed, such as by selecting a map correlated with a particular variator input speed etc. Moreover, it will be appreciated that values may be retrieved from multiple maps and interpolated to derive a needed actuator pressure differential when operating at an RPM for which no map is available. At stage 505, the controller 401 outputs a solenoid current signal 1 (405) and solenoid current signal 2 (406) based on the actuator pressure differential identified in stage 504.

At stage 506, the controller 401 again reads the circuit pressures from circuit pressure sensors 402 and calculates the actual output torque of the variator 100. In particular, those of skill in the art will appreciate that the output torque of a variator is related to and can be directly calculated from the internal hydraulic pressure of the variator. At stage 507, the controller 401 compares the desired torque from stage 502 with the actual torque from stage 506 and derives a map error value representing the difference between the desired torque and the actual torque. The map error value may represent an absolute error, expressed as torque or pressure, for example, or a relative or percent error.

At stage 508, the controller 401 determines whether the map error value exceeds a predetermined threshold value $E_t$ such as 5% of the desired torque. The threshold $E_t$ may alternatively represent an absolute torque difference, an absolute pressure difference or other suitable parameter. If it is found that the map error value exceeds the predetermined threshold value, the process flows to stage 509. Otherwise, the process returns to stage 501. At stage 509, the controller 401 determines whether map error values for the same map point M have been found to exceed the predetermined threshold value $E_t$ more than a number x of consecutive uses of that same map point M, e.g., without alteration of the map point M. In an embodiment, two consecutive map error values for the same map point M that both exceed the predetermined threshold value $E_t$ but in opposite directions (e.g., the actual torque is substantially greater than the desired torque during one pass and substantially less than the desired torque on a second pass) are not deemed to meet the test of stage 509.

If it is determined at stage 509 that map error values for the same map point M have been found to exceed $E_t$ for more than x consecutive uses, the process flows to stage 510, wherein the controller 401 replaces the map point M with a new map point M' to reduce the map error value. The new map point M' may be selected by any suitable means, but in an embodiment, the new map point M' is derived by multiplying the map point M by a gain G. For example, in one example, G=(desired torque/$E_t$), and M'=G·M. In an alternative embodiment, the new map point M' is derived by adding an offset to the prior map point M. From stage 510, the process returns to stage 501 to again await steady state operation.

By executing the process 500, inaccuracies in the map 300 are progressively reduced during use so that the actual output torque of the variator 100 becomes more closely aligned with the desired torque expressed at the operator interface 407. The ability to derive and refine a torque control map is valuable in many contexts. For example, in many transmissions, input torque is controlled during shifting to ensure smooth shifts. In such contexts, the ability to produce an actual output torque that closely correlates to an expected output torque will enhance the quality of shifts.

It will be appreciated that the variator system 100 operates in a steady state mode as discussed above and that the process 500 modifies the torque control map 300 during such steady state operation. However, the system 100 also operates in a transient condition much of the time, and during such times, the torque control map is used but not necessarily modified by process by 500. Thus, during the return loop 511 after stage 501 when steady state operation is not detected, the controller 401 utilizes the torque control map 300, for example in a traditional manner, to control the variator 100 for one control period. A control period is a period during which variator control signals are reestablished or adjusted, typically by reading the map 300 and providing corresponding control signals to variator system 100.

It will be appreciated that the described process is further applicable to the task of initially creating one or more torque control maps. Typically, torque control maps are manually populated by trained technicians prior to deployment of a particular device or class of device. However, this approach is time-consuming and resource-intensive, and is also often prone to inaccuracy due to human error. In an embodiment, the process 500 is used to populate a blank map. In this embodiment, stage 504 is modified to include either calculating a potentially very rough map value based on an appropriate principle or expression, or using a map value of zero. Moreover, the time criteria value x in stage 509 may be set to a minimal value (e.g., 1) to accelerate the map generation process.

In addition to creating and refining a torque control map, the principles of operation described herein are also useful for providing a system diagnostic function. Failures in the hydraulic system may be detected via a prolonged series of errors or the detection of a smaller number of unexpectedly large errors. For example, the error values found in stage 507 may be tabulated, and a potential system failure flagged if substantial errors (either relative to the threshold value $E_t$ or another suitable threshold) are detected for one or more map points for more than a predetermined number of samples and/or for longer than a predetermined number of passes. Additionally or alternatively, error values exceeding an acceptable window of deviation (e.g., 1.5×) may result in an indication of potential system failure.

Figure 6:
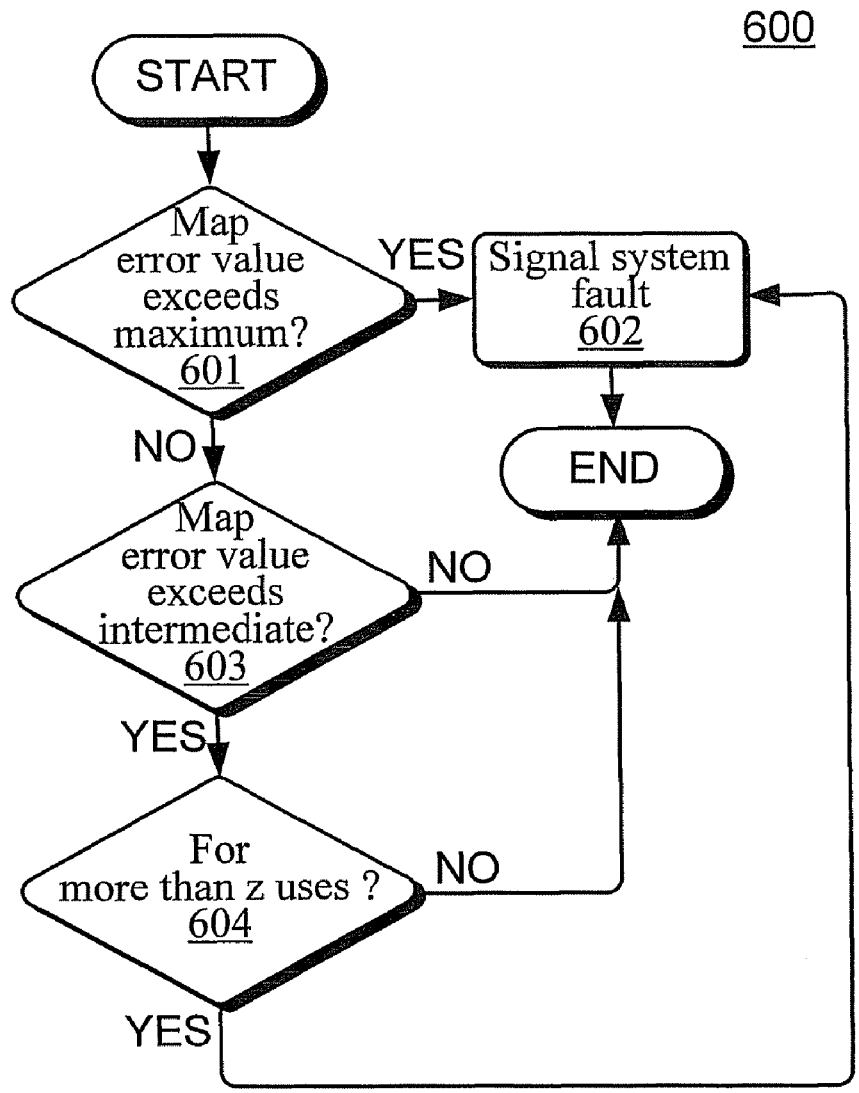
FIG. 6 is a flowchart illustrating a process for detecting a fault in the variator system via correspondence between actual and expected torques.

FIG. 6 is a flow chart 600 illustrating a process of detecting system failure or erroneous operation according to one embodiment. The process 600 operates on the principle that large or repeated error levels in map values may indicate that a system fault is preventing the desired level of accuracy. In an example, the process 600 is executed based on the result of stage 507 of process 500 wherein a map error value is determined. At stage 601 of the process 600 the controller 401 determines whether the map error value exceeds a predetermined maximum error value (error limit value). If it is determined at stage 601 that the map error value exceeds the predetermined maximum error value, the controller 401 signals a system fault at stage 602 and exits process 600. With respect to the system fault signal, the controller 401 may set an error flag in a memory at this stage, e.g., for later retrieval by a technician, and/or produce an error output for a user interface. The error output may comprise a visual and/or audible signal.

If it is determined at stage 601 that the map error value does not exceed the predetermined maximum error value, the process 600 flows to stage 603. At stage 603, the controller 401 determines whether the map error value exceeds a predetermined intermediate error value (error limit value) that is less than the maximum error value. If it is determined at stage 603 that the map error value does not exceed the predetermined intermediate error value, the controller exits the process 600.

Otherwise, the process 600 flows to stage 604, wherein the controller 401 determines whether the map error value has been determined to exceed the intermediate error value for more than a predetermined number z of consecutive uses of the same map point. For example, the predetermined number z may be three, four, or any other suitable number depending upon user or manufacturer preferences. If at stage 604 the map error value has been determined to exceed the intermediate error value for more than z consecutive uses of the same map point, the process 600 flows to stage 602 and signals a system fault. Otherwise, the process exits.

INDUSTRIAL APPLICABILITY

The industrial applicability of the variator torque control system described herein will be readily appreciated from the foregoing discussion. A technique is described wherein a variator output is torque-controlled via modification of a torque control map so that the actual output torque of the variator closely matches the desired output torque. Torque control mappings may be created with inaccuracies or may become inaccurate due to operating environment variations, machine variations, tolerance changes, and so on. In an example, the described torque control system replaces a map value when that value is found to lead to a reproducible error, in order to improve the correlation between the desired or expected and actual output torque of the variator. The system also may be used initially to populate a torque control map rather than requiring manual population of the map.

In addition, the ability of the system to identify potential system faults via the monitoring of error values allows such conditions to be detected and corrected before they lead to additional expensive damage and/or excessive down time for repairs. In particular, if a particular map value is found to be erroneous by more than a maximum error value, or if it exhibits a pattern of lesser repeated errors, the system controller may indicate that the system is faulted, e.g., by a leak or pressure loss.

Examples of the present disclosure are applicable to any system employing a hydraulic variator wherein it is desired that the output torque of the variator closely match an expected output torque value. For example, many transmission systems, especially for heavy industrial machines, use components such as continuously variable transmissions that employ a variator and that thus may benefit from application of the teachings herein. In such machines, application of the foregoing teachings can provide better shift performance and improved user experience due to more precise torque control at the transmission input and output shafts. Thus, for example, a heavy industrial machine employing such a transmission may be operated for long time periods and in widely varied operating environments without experiencing variator torque-related errors in shift behavior. Thus, although a variator torque control map may become inaccurate over time and/or across different environments, the map can be progressively refined as conditions change to maintain the shift quality of the associated transmission.

It will be appreciated that the foregoing description provides examples of the disclosed system and technique. However, it is contemplated that other implementations of the disclosure may differ in detail from the foregoing examples. All references to examples herein are intended to reference only the particular example being discussed at that point and are not intended to imply any limitation as to the scope of the innovation more generally. All language of distinction and disparagement with respect to certain features is intended to indicate a lack of preference for those features, but not to exclude such from the scope of the innovation entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this innovation includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

We claim:

1. A method of controlling an output torque of a variator having a hydraulic actuator responsive to an actuator pressure signal, the method comprising:

receiving an indication of a first expected output torque;

evaluating a plurality of parameters related to operation of the variator;

reading a map to link the plurality of parameters to a first mapped value for the actuator pressure signal, wherein the first expected output torque is associated with the first mapped value;

applying the first mapped value to the hydraulic actuator as the actuator pressure signal;

measuring a first output torque of the variator and comparing the first output torque to the first expected output torque to derive an error value;

determining whether the error value conforms to at least one modification condition;

replacing the first mapped value of the map with a modified value if it is determined that the error value conforms to at least one modification condition;

determining whether the error value exceeds a first error limit value, and producing a system error signal if it is determined that the error value exceeds the first error limit value; and determining whether the error value has exceeded a second error limit value that is less than the first error limit value, and if so, whether the error value has exceeded the second error limit value more than a predetermined number of times, and producing the system error signal if the error value has exceeded the second error limit value more than the predetermined number of times.

2. The method according to claim 1, wherein determining whether the error value conforms to at least one modification condition includes:

determining whether the error value exceeds a first predetermined threshold value; and determining whether the error value has exceeded the first predetermined threshold value more than a predetermined number of times if it is determined that the error value exceeds the first predetermined threshold value.

3. The method according to claim 1, wherein receiving the indication of the first expected output torque includes receiving a signal from an accelerator interface.

4. The method according to claim 1, wherein the actuator pressure signal corresponds to a pressure differential.

5. The method according to claim 4, wherein the actuator pressure signal includes at least two solenoid current signals directed to at least two respective solenoid valves for controlling the actuator.

6. The method according to claim 2, wherein the first predetermined threshold value represents a percentage of the first expected output torque.

7. The method according to claim 2, wherein the first predetermined threshold value represents a parameter selected from the group consisting of a pressure value and a torque value.

8. The method according to claim 1, wherein replacing the first mapped value with the modified value includes multiplying the first mapped value by a gain factor to yield the modified value.

9. The method according to claim 1, wherein replacing the first mapped value with the modified value includes adding an offset to the first mapped value.

10. A method of detecting a fault in a variator having a hydraulic actuator responsive to an actuator pressure signal, the method comprising:

receiving an indication of a first expected output torque;
evaluating a plurality of parameters related to operation of the variator;

reading a map to link the plurality of parameters to a first mapped value for the actuator pressure signal, wherein the first expected output torque is associated with the first mapped value;

applying the first mapped value to the hydraulic actuator as the actuator pressure signal;

measuring a first output torque of the variator and comparing the first output torque to the first expected output torque to derive an error value;

determining whether the error value exceeds a first error limit value;

producing a system error signal if it is determined that the error value exceeds the first error limit value and otherwise determining whether the error value exceeds a second error limit value that is less than the first error limit value;

determining whether the error value has exceeded the second error limit value more than a predetermined number of times if it is determined that the error value exceeds the second error limit value; and producing the system error signal if it is determined that the error value has exceeded the second error limit value more than the predetermined number of times.

11. The method according to claim 10, wherein producing the system error signal includes producing a signal selected from the group consisting of an audible signal and a visual signal.

12. The method according to claim 10, wherein producing the system error signal includes setting an error flag in a memory.

13. The method according to claim 10, wherein the actuator pressure signal includes at least two solenoid current signals directed to at least two respective solenoid valves for controlling the actuator.

14. The method according to claim 10, wherein the first and second error limit values represent a percentage of the first expected output torque.

15. The method according to claim 10, wherein the first and second error limit values represents a parameter selected from the group consisting of a pressure value and a torque value.

16. A variator controller for controlling an output torque of a variator via a hydraulic actuator, the variator controller comprising:

a processor system including:
a digital data processor;
a first data input connected to at least one circuit pressure sensor to receive a signal related to a hydraulic pressure within an internal hydraulic circuit of the variator;
a second data input connected to a pump speed sensor to receive a signal related to a rotational speed of a variator input shaft;
a third data input connected to a motor speed sensor to receive a signal related to a rotational speed of a variator output shaft;
a fourth data input connected to an operator interface to receive a signal related to an expected torque;
a fifth data input connected to receive a signal corresponding to a first mapped control pressure based on data received at the first, second, and third data inputs; and
a computer-readable memory having stored thereon computer-executable instructions to cause the processor to evaluate a plurality of parameters related to operation of the variator, read a map to link the plurality of parameters to a first mapped value associated with the first expected torque, and determine that the error value conforms to at least one modification condition and replace the first mapped value with a modified value.

17. The variator controller according to claim 16, wherein determining that the error value conforms to at least one modification condition includes:
   determining whether the error value exceeds a first predetermined threshold value; and
   determining whether the error value has exceeded the first predetermined threshold value more than a predetermined number of times if it is determined that the error value exceeds the first predetermined threshold value.

18. The variator controller according to claim 16, wherein the first predetermined threshold value represents a percentage of the expected torque.

19. The variator controller according to claim 16, wherein the first predetermined threshold value represents a parameter selected from the group consisting of a pressure value and a torque value.

20. The variator controller according to claim 16, wherein the signal related to the expected torque comprises a signal from an accelerator interface.

* * * * *

UNITED STATES PATENT AND TRADEMARK OFFICE
CERTIFICATE OF CORRECTION

| | |
|---|---|
| PATENT NO. | : 7,920,949 B2 |
| APPLICATION NO. | : 11/752136 |
| DATED | : April 5, 2011 |
| INVENTOR(S) | : Brian D Kuras et al. |

It is certified that error appears in the above-identified patent and that said Letters Patent is hereby corrected as shown below:

Title Page

In the Inventors section (75), the name of the fourth inventor should be changed from "Tyler Bowan" to --Tyler Bowman--.

Signed and Sealed this
Fourteenth Day of June, 2011

David J. Kappos
*Director of the United States Patent and Trademark Office*